(12) United States Patent
Schultalbers et al.

(10) Patent No.: US 10,795,349 B2
(45) Date of Patent: Oct. 6, 2020

(54) METHOD AND DEVICE FOR TESTING SOFTWARE OF AN ELECTRONIC CONTROL UNIT OF A VEHICLE

(71) Applicant: IAV GmbH Ingenieurgesellschaft Auto und Verkehr, Berlin (DE)

(72) Inventors: Matthias Schultalbers, Meinersen (DE); Hans-Martin Schulz, Braunschweig (DE); Helmut Naujoks, Hannover (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 609 days.

(21) Appl. No.: 15/668,727

(22) Filed: Aug. 4, 2017

(65) Prior Publication Data
US 2018/0329408 A1    Nov. 15, 2018

Related U.S. Application Data

(60) Provisional application No. 62/505,156, filed on May 12, 2017.

(51) Int. Cl.
| | |
|---|---|
| G05B 23/02 | (2006.01) |
| G07C 5/08 | (2006.01) |
| G06F 11/36 | (2006.01) |
| G06F 11/26 | (2006.01) |
| B60R 16/023 | (2006.01) |

(52) U.S. Cl.
CPC ........ *G05B 23/0294* (2013.01); *G06F 11/261* (2013.01); *G06F 11/36* (2013.01); *G06F 11/3672* (2013.01); *G07C 5/085* (2013.01); *B60R 16/0231* (2013.01)

(58) Field of Classification Search
None
See application file for complete search history.

(56) References Cited

U.S. PATENT DOCUMENTS

| | | | |
|---|---|---|---|
| 2010/0191515 A1 | 7/2010 | Walenta et al. | |
| 2010/0292974 A1 | 11/2010 | Krainz et al. | |
| 2017/0103591 A1* | 4/2017 | Ramberg | G07C 5/0808 |
| 2017/0131202 A1* | 5/2017 | McClintock | G01N 21/3504 |
| 2018/0171922 A1* | 6/2018 | Noh | F02D 41/22 |
| 2019/0331555 A1* | 10/2019 | Schat | F02D 41/26 |

FOREIGN PATENT DOCUMENTS

| | | |
|---|---|---|
| DE | 102007025125 B3 | 1/2009 |
| DE | 102008027896 A1 | 2/2010 |
| DE | 102008059684 A1 | 6/2010 |
| DE | 102010046352 A1 | 5/2011 |
| DE | 102011108697 A1 | 1/2013 |
| DE | 102012202295 A1 | 8/2013 |
| DE | 102013003493 A1 | 8/2014 |
| EP | 1672348 A1 | 6/2006 |
| EP | 2244141 B1 | 10/2012 |
| EP | 2162803 B1 | 7/2015 |

OTHER PUBLICATIONS

Contag et al. "How They Did It: An Analysis of Emission Defeat Devices in Modern Automobiles", 2017, IEEE Symposium on Security and Privacy, May 22-26, 2017, 20 pages. (Year: 2017).*
European Commission, "Guidance on the evaluation of Auxiliary Emission Strategies with regard to the application of Regulation (EC) No. 715/2007 on type approval of motor vehicles with respect to emissions from light passenger and commercial vehicles (Euro 5 and Euro 8)", Jan. 26, 2017, 18 pages. (Year: 2017).*
Department for Transport, "Vehicle Emissions Testing Programme Moving Britain Ahead" Apr. 2016, 39 pages. (Year: 2016).*
Tang et al., "A Simple Test Method to Monitor Emission Control Operating State Space (Emission Control Failure & Defeat Device Recognition)", SAE Technical Paper Series, Oct. 17, 2016, pp. 1-7, vol. 1. (Year: 2016).*
Mouzakitis et al., "Hardware-in-the-loop system for testing automotive ECU diagnostic software", Measurement + Control, vol. 42, Oct. 2009, 8 pages. (Year: 2009).*
Frank Langner, et al., "Fahrversuch versus Gil-Test: High-Tech Unterstützung für die Qualitätssicherung durch Hil-Testsysteme im Vergleich zu Entwicklungsfahrzeugen", berner & matter: optimizing your development, Jun. 2, 2008, pp. 1-13.
Michael Paulweber, et al., "Mess- und Prüfstandstechnik", Antriebsstrangentwicklung Hybridisierung Elektrifizierung, Dec. 2014, pp. 52-64.
Stenografisches Protokoll der 6. Sitzung, Tagesordnung—Öffentliche Beweisaufnahme, „Funktionsweisen und Möglichkeiten von Abschalteinrichtungen und sonstigen Manipulationen einer NOx-Abgasreinigung, Sep. 22, 2016, p. 15.

* cited by examiner

Primary Examiner — Suzanne Lo
(74) Attorney, Agent, or Firm — Leydig, Voit & Mayer, Ltd.

(57) ABSTRACT

A method for testing software of an electronic control unit of a vehicle includes, in a first step, executing a driving cycle, whereby input quantities and output quantities of the electronic control unit are recorded. In an additional step, the driving cycle in accordance with the first step is repeated without once again executing the driving cycle with the vehicle on the testing device so that additional output quantities are made available. It is ascertained that the software comprises a function that recognizes whether a driving cycle is being executed with the vehicle, based on there being a deviation between at least one output quantity that had been recorded in the first step and the corresponding output quantity provided in accordance with the additional step. Based thereon, a function of the electronic control unit is excluded from being further developed or processed during a subsequent development step.

6 Claims, 1 Drawing Sheet

METHOD AND DEVICE FOR TESTING SOFTWARE OF AN ELECTRONIC CONTROL UNIT OF A VEHICLE

CROSS-REFERENCE TO PRIOR APPLICATION

Priority is claimed to U.S. Provisional Patent Application No. 62/505,156, filed on May 12, 2017, the entire disclosure of which is hereby incorporated by reference herein.

FIELD

The present invention relates to a method and to a device for testing software of an electronic control unit of a vehicle.

BACKGROUND

As is generally known, electronic control units are employed in vehicles for regulation and control purposes. Particularly when it comes to the regulation and control of the engine of a vehicle, it is a known approach to employ at least one electronic control unit. Signals from sensors are sent to this electronic control unit. These signals are processed by the electronic control unit or by the software of this electronic control unit. In turn, an actuator receives signals that are formed by means of the electronic control unit as a function of the above-mentioned processing so that the actuator influences a physical process that is taking place during the operation of the engine.

In a follow-up to the development of electronic control units for vehicles, especially the development of the very large number of functions that regulate and control the engine of a vehicle as well as the parameterization of these functions, it can be necessary to identify non-documented functions. For instance, it can be desirable to ascertain whether the regulation and control of a vehicle comprises non-documented functions that have an influence on the fuel consumption and on the vehicle emissions when the vehicle is undergoing testing that is required by law.

For example, according to German patent application DE 102011108697 A1, in order to detect manipulation of the regulation and control of the engine of a vehicle, it is common practice in the state of the art to calculate a reference value for the acceleration of the vehicle as well as to measure the actual acceleration of the vehicle and to then ascertain that the regulation and control have been manipulated if the reference value and the measured value deviate impermissibly from each other. The inventors have recognized that a drawback of this approach is that it is only possible to detect manipulations that have an effect on the acceleration of the vehicle.

SUMMARY

In an embodiment, the present invention provides a method for testing software of an electronic control unit of a vehicle, the software comprising functions for processing input quantities that serve to form output quantities of the electronic control unit. In a first step, a driving cycle is executed with the vehicle on a testing device, whereby the vehicle is not moving with respect to the surroundings, the input quantities and output quantities of the electronic control unit being recorded in the first step. In an additional step, the driving cycle in accordance with the first step is repeated without once again executing the driving cycle with the vehicle on the testing device so that additional output quantities are made available. The driving cycle is repeated in the additional step in that the software or the electronic control unit is excited or stimulated with the input quantities that had been recorded in accordance with the first step, wherein at least one input quantity that serves to excite or stimulate the software and that had been recorded in the first step is changed in the additional step in such a way that a movement of the vehicle with respect to the surroundings is simulated. The output quantities that had been recorded in the first step are compared to the additional output quantities that are available in accordance with the additional step. It is ascertained that the software comprises a function that recognizes whether or not a driving cycle is being executed with the vehicle on the testing device, based on there being a deviation between at least one output quantity that had been recorded in the first step and the corresponding output quantity provided in accordance with the additional step. Based thereon, at least one of the functions of the electronic control unit is excluded from being further developed or processed during a subsequent development step.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
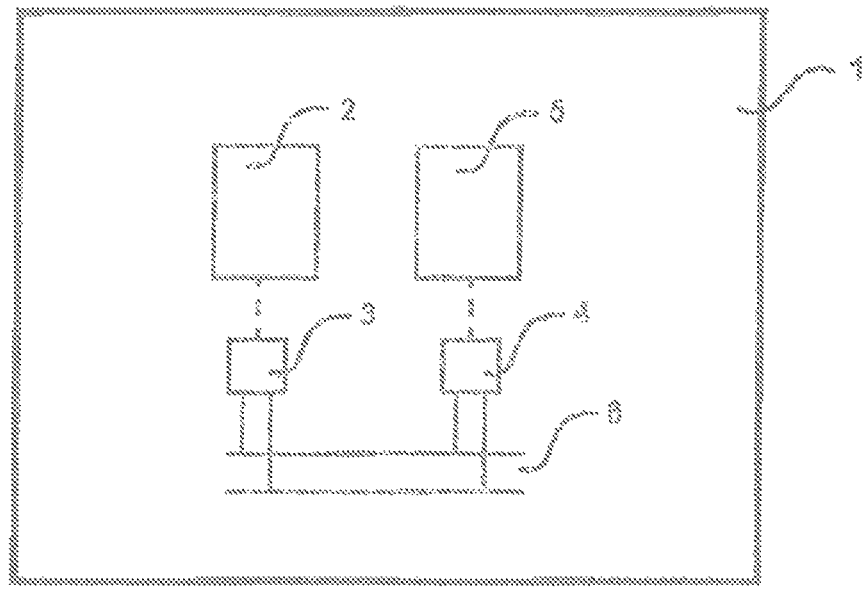
FIG. 1 is a schematic overview of a vehicle with electronic control units.

In an embodiment, the present invention configures the procedure for testing software of an electronic control unit of a vehicle so that it is as comprehensive as possible.

According to the invention in a first embodiment, in order to test software of an electronic control unit of a vehicle comprising functions for processing input quantities that serve to form output quantities of the electronic control unit, in a first step while the vehicle is standing still, in other words, not moving with respect to the surroundings or road surface, a driving cycle is executed on a testing device, a process in which the input quantities and output quantities of the electronic control unit are recorded. In an additional step, the driving cycle in accordance with the first step is repeated, although without once again executing the driving cycle with the vehicle on a testing device. In any case, this means that additional output quantities of the electronic control unit or of the software are made available. The driving cycle is repeated in the additional step in that the software or the electronic control unit is excited or stimulated with the input quantities that had been recorded in accordance with the first step. In this process, at least one input quantity that serves to excite or stimulate the software and that had been recorded in the first step is changed in the additional step in such a way that a movement of the vehicle is simulated as if it were actually moving (in traffic) with respect to the surroundings, that is to say, a movement of the vehicle with respect to the surroundings or road surface is simulated. In other words, at least one input quantity that serves to excite or stimulate the software or the electronic control unit and that had been recorded in a first step is changed in the additional step in such a way that ambient conditions of the vehicle are changed in comparison to the recording or measurement in the first step. Over the further course, the output quantities that had been recorded in the first step are compared to the additional output quantities that are available in accordance with the additional step, thereby demonstrating that the software of the electronic control unit comprises a function that recognizes whether or not a driving cycle is being executed with the vehicle on a testing device, and demonstrating that at least one output quantity that had been recorded in the first step deviates from the (corresponding) output quantity provided in accordance with the additional step.

In other words, according to an embodiment of the invention, to start with, a first measurement of quantities of the electronic control unit is carried out during an actual test of the vehicle on a testing device or during an actual roller dynamometer test. Over the further course, the input quantities of the electronic control unit measured in this manner are changed in order to emulate the movement of a vehicle relative to the surroundings or traffic or road surface, in other words, for instance, the steering angle signal is varied. Then, over the further course, these changed input quantities of the electronic control unit are used as the basis for a simulation of a driving cycle, whereby the software that is to be tested or the electronic control unit that is to be tested is part of this simulation. In any case, a virtual repetition (virtual test) of the driving cycle in accordance with the first step is thus carried out, so that once again output quantities of the electronic control unit or of the software are made available for further processing. On the basis of a deviation between the output quantities from the actual test on a testing device or from the actual roller dynamometer test and the output quantities from the virtual test on a testing device or from the virtual roller dynamometer test, it is possible to draw conclusions as to whether a detection function that responds to test conditions is present and, as a function thereof, whether the control and/or regulation of the vehicle is being influenced.

In this context, it is especially advantageous that, in this manner, it is also possible to detect non-documented functions that are not otherwise obvious or that are not easy to identify during the actual operation of a vehicle. Moreover, it is advantageous that the software of an electronic control unit can be tested on the basis of concrete measured results. This is very helpful at the end of a development phase, in other words, especially when series production approval is to be granted and when it has to be ensured that the software used to regulate and control the vehicle or a sub-unit of the vehicle does not comprise any functions that have not been documented. Substantiation structured in this manner, as is made possible by the invention, can also be useful for purposes of examining or safeguarding software that has already gone into serial production.

According to the invention in another embodiment, in order to test software of an electronic control unit of a vehicle comprising functions for processing input quantities that serve to form output quantities of the electronic control unit, in a first step, a driving cycle is being executed with a vehicle that is not standing still, in other words, a vehicle that is moving with respect to the surroundings or road surface and that is equipped with a mobile emission measuring device that serves to analyze the exhaust gas emissions of the vehicle, and in this process, the input quantities and output quantities of the electronic control unit are recorded. In an additional step, the driving cycle in accordance with the first step is repeated, although without once again executing the driving cycle with the vehicle that is equipped with a mobile emission measuring device that serves to analyze the exhaust gas emissions of the vehicle, in other words, without once again moving the thus equipped vehicle with respect to the surroundings or road surface, for example, along a given route. In any case, additional output quantities of the electronic control unit or of the software are available in this manner. The driving cycle is repeated in the additional step in that the software or the electronic control unit is excited or stimulated with the input quantities that had been recorded in accordance with the first step. In this context, at least one input quantity that serves to excite or stimulate the software and that had been recorded in the first step is changed in the additional step in such a way that the lack or absence of the vehicle's being equipped with a mobile emission measuring device that serves to analyze the exhaust gas emissions of the vehicle is simulated as if the vehicle were actually moving in traffic, that is to say, the operation of a vehicle that is not equipped with a mobile emission measuring device that serves to analyze the exhaust gas emissions of the vehicle is simulated. To put it in other words, at least one input quantity that serves to excite or stimulate the software or the electronic control unit and that had been recorded in the first step is changed in the additional step in such a way that, in comparison to the recording or measurement in the first step, properties of the vehicle that result or that can result from equipping the vehicle with a mobile emission measuring device that serves to analyze the exhaust gas emissions of the vehicle are changed or varied. Over the further course, the output quantities that had been recorded in the first step are compared to the additional output quantities that are available in accordance with the additional step, thereby demonstrating that the software of the electronic control unit comprises a function that recognizes whether or not the vehicle is equipped with a mobile emission measuring device that serves to analyze the exhaust gas emissions of the vehicle for a driving cycle or vehicle test, and demonstrating that at least one output quantity that had been recorded in the first step deviates from the (corresponding) output quantity provided in accordance with the additional step.

In other words, according to an embodiment of the invention, to start with, a first measurement of quantities of the electronic control unit is carried out during an actual test of the vehicle, whereby the vehicle is equipped with a mobile emission measuring device that serves to analyze the exhaust gas emissions of the vehicle. Over the further course, the input quantities of the electronic control unit measured in this manner are changed in order to emulate the operation of the vehicle without its being equipped with a mobile emission measuring device that serves to analyze the exhaust gas emissions of the vehicle as if it were actually moving in traffic. Towards this end, for instance, an electric quantity is varied which relates to or indicates the operation of the vehicle with a trailer that can be hitched to the vehicle by means of a trailer hitch on the vehicle (trailer detection). For instance, electric quantities for supplying the trailer with electric energy relate to the operation of the vehicle with a trailer. In other words, such quantities are dependent on whether or not the vehicle is being used with a trailer, or else they indicate this. For this reason, according to an embodiment of the invention, the approach is such that, in order to operate a mobile emission measuring device that serves to analyze the exhaust gas emissions of the vehicle, this emission measuring device is regularly connected to the supply of electric energy for the trailer, as a result of which at least one of the cited electric quantities changes. Over the further course, the changed input quantities of the electronic control unit are then used as the basis for a simulation of a driving cycle, whereby the software that is to be tested or the electronic control unit that is to be tested is part of this simulation. In any case, a virtual repetition (virtual test) of the driving cycle in accordance with the first step is thus carried out, so that, once again, output quantities of the electronic control unit or of the software are made available for further processing. On the basis of a deviation between the output quantities from the actual test of the vehicle equipped with a mobile emission measuring device that serves to analyze the exhaust gas emission of the vehicle (in accordance with the first step) and the output quantities from the virtual test (in accordance with the additional step), it is possible to draw conclusions as to whether a detection function that responds to test conditions is present and, as a function thereof, whether the control and/or regulation of the vehicle is being influenced.

In this context, it is especially advantageous that, in this manner, it is also possible to detect non-documented functions that are not otherwise obvious or that are not easy to identify during the actual operation of a vehicle. Moreover, it is advantageous that the software of an electronic control unit can be tested on the basis of concrete measured results. This is very helpful at the end of a development phase, in other words, especially when series production approval is to be granted and when it has to be ensured that the software used to regulate and control the vehicle or a sub-unit of the vehicle does not comprise any functions that have not been documented. Substantiation structured in this manner, as is made possible by the invention, can also be useful for purposes of examining or safeguarding software that has already gone into serial production.

A vehicle 1 has at least one electronic control unit 3 for purposes of regulating and controlling the engine 2. The engine 2 can especially be a diesel or Otto internal combustion engine and/or an electric motor. The vehicle 1 comprises at least one additional electronic control unit 4 for the regulation and control of additional processes or sequences (especially in terms of the driving dynamics or in terms of supplying electric energy to a trailer or in terms of detecting the trailer) of the vehicle 1 or of other sub-aggregates or sub-units 5 of the vehicle 1, for instance, the brake system of the vehicle 1 or, in fact, of a trailer that can be hitched to the vehicle 1. The two cited electronic control units 3, 4 are connected to each other, as is known, for purposes of exchanging data by means of a bus system 6. Sensors (for instance, a steering-angle sensor) and actuators (for example, a windshield wiper motor) that are equipped with processors can also be connected to the bus system 6 in order to prepare the signals or data so that the signals or data of such intelligent components can reach the bus system 6 directly, thus making it possible to send them to all of the electronic control units 3, 4 that are connected to the bus system 6. Of course, any desired number of other electronic control units can be connected to the bus system 6, for example, also an electronic control unit for the regulation and control of the exhaust gas after-treatment of an internal combustion engine (SCR electronic control unit).

Figure 2:
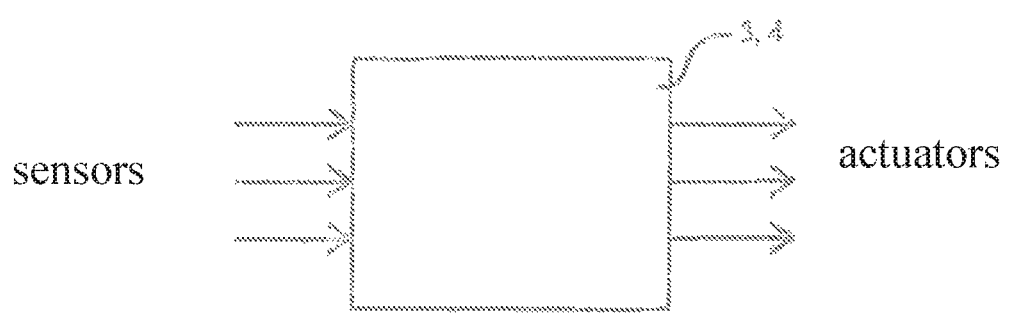
FIG. 2 is a schematic overview of the electronic control units.

As is shown in FIG. 2, signals from sensors are sent to the electronic control unit 3 via the bus system 6 for purposes of regulating and controlling the engine 2. In particular, signals are sent to the electronic control unit 3 relating to the rotational speed of the crankshaft of the engine 2 (rotational speed sensor), the load of the engine 2 (torque, intake air pressure, throttle valve position, fuel injection quantity) and the combustion air-fuel ratio (lambda probe) (input signals or input quantities). These signals and, if applicable, also additional signals sent to the electronic control unit 3, are processed by means of the electronic control unit 3. Actuators, in turn, receive signals (output signals or output quantities) that are formed by the electronic control unit 3 or by the software as a function of the above-mentioned processing, so that the appertaining actuator influences a physical process (especially the combustion process) that occurs during the operation of the engine 2. Actuators are especially members or final control elements that exert an influence on the fuel consumption and on the emissions of the engine 2 or of the vehicle 1, in other words, especially injectors (start of the actuation, duration of the actuation, frequency of the actuation per operational cycle), throttle valves (AGR, intake air) or spark plugs.

As is also shown in FIG. 2, signals (input signals or input quantities) from sensors or switches are likewise sent via the bus system 6 to the additional electronic control unit 4 for purposes of regulating and controlling other processes or sequences (especially in terms of the driving dynamics or in terms of supplying electric energy to a trailer or in terms of detecting the trailer) of the vehicle 1.

If the additional electronic control unit 4 serves to regulate and control the driving dynamics of the vehicle 1, then signals relating to the rotational speed of the wheels of both axles of the vehicle 1 (rotational speed sensors on the individual wheels of each axle) as well as signals relating to the turning angle of the steering wheel of the vehicle 1 (steering angle) are sent to the additional electronic control unit 4. These signals and, if applicable, also additional signals that are sent to the electronic control unit 4, are processed by means of the electronic control unit 4. Actuators, in turn, receive signals (output signals) that are formed by the electronic control unit 4 or by the software as a function of the above-mentioned processing, so that the appertaining actuator influences a physical process or else a procedure or sequence (driving process) that occurs during the operation of the vehicle 1. Actuators are especially members or final control elements that exert an influence on the driving dynamics of the vehicle 1, in other words, especially the individual wheel brake cylinders or brake calipers or else the hydraulic unit or hydraulic valves of the brake system of the vehicle 1.

If the additional electronic control unit 4 serves to regulate and control the supply of electric energy to a trailer or to detect a trailer, then signals containing, for instance, information about a microswitch installed in a trailer socket are sent to the additional electronic control unit 4. These signals and, if applicable, also additional signals sent to the electronic control unit 4, are processed by means of the electronic control unit 4. Actuators, in turn, receive signals (output signals) that are formed by the electronic control unit 4 or by the software as a function of the above-mentioned processing, so that the appertaining actuator influences a physical process or else procedure or sequence (trailer detection, trailer lighting) that occurs during the operation of the vehicle 1. In this context, the actuators are especially display elements, in other words, particularly the individual lighting elements of a trailer such as, for example, the tail lights of the trailer or a light on the instrument panel of the vehicle 1 that indicates to the driver whether a trailer has been hitched on or not. For instance, if this switch is open, it can be concluded from this that there is no trailer connected to the on-board system of the vehicle 1 via the trailer socket. In contrast, if this switch is closed, it can be concluded from this that there is a trailer connected to the on-board system of the vehicle 1 via the trailer socket. Instead of the use of a microswitch, it is also conceivable for the trailer to be detected via the coupled electric load of the trailer lighting. In this context, the signals sent to the additional electronic control unit 4 especially relate to electric quantities such as current and voltage, which are processed by means of the electronic control unit 4 and are sent as output signals to the cited optical actuators (lights on the instrument panel of the vehicle 1, lighting elements on the trailer).

Via the bus system 6 or by means of the bus system 6, all of the signals that are sent to the electronic control unit 3 can also be sent to the additional electronic control unit 4, or else all of the signals that can be sent to the additional electronic control unit 4 can also be sent to the electronic control unit 3.

By the same token, the output signals of the electronic control unit 3 can also be sent to the additional electronic control unit 4, or else the output signals of the additional electronic control unit 4 can also be sent to the electronic control unit 3.

As is common knowledge, the electronic control unit 3 comprises, on the one hand, hardware and, on the other hand, software or a program for processing the input signals or for forming output signals or for influencing the physical processes that occur during the operation of the engine 2. The software of the electronic control unit can be divided into program code and data. The program code of the electronic control unit 3 comprises the individual functions that are to be executed while the data comprises the parameters of these functions. Within the scope of the development of the electronic control unit 3 or of the vehicle 1, in turn, new functions as well as their parameterization or at least a parameterization of existing functions are created, for example, if the engine 2 was only modified to a slight extent.

As a rule, all of the functions are documented at the time of their development or else subsequent thereto, and can thus be unambiguously identified by a person involved in the development of the electronic control unit 3, or else these functions can be derived on the basis of their effect on the process that is to be regulated and controlled. However, it cannot be ruled out that the program code, especially of the electronic control unit 3, might contain a non-documented function. In particular, this function can exert an influence on the fuel consumption and on the emissions of the vehicle 1 in that, on the basis of this function, it is ascertained whether the vehicle 1 is actually moving in road traffic or whether it is being tested on a testing device or roller dynamometer (in other words, with the vehicle 1 standing still), or rather if it is being tested in that the vehicle 1 is equipped with a mobile emission measuring device that serves to analyze the exhaust gas emission for a driving cycle that is to be executed with the non-stationary vehicle 1, in other words, a vehicle 1 that is moving with respect to the surroundings or road surface, whereby then, if it is ascertained that the vehicle 1 is being tested, the software of the electronic control unit 3 is being influenced impermissibly or other functions are being influenced impermissibly. In this context, especially the processing of the input signals or the formation of output signals that serve to influence the physical processes that occur during the operation of the engine 2 can be carried out on the basis of (additional) non-documented functions or else with parameters of documented functions that deviate from the parameters that are used as the basis for the regulation and control of the engine 2 when the vehicle 1 is actually moving in road traffic, that is to say, when this does not relate to test conditions involving, for example, either a stationary vehicle 1 (testing on a roller dynamometer) or a vehicle that is moving with respect to the surroundings or road surface and that is equipped with a mobile emission measuring device that serves to analyze the exhaust gas emissions of the vehicle 1. In any case, it is the objective of an embodiment of the present invention to configure the testing of the electronic control unit 3 in a more comprehensive manner by identifying the non-documented functions described above, thereby making it possible to effectively prevent the above-mentioned impermissible influencing of the properties of the vehicle 1.

According to an embodiment of the invention, the method for testing an electronic control unit 3, 4 of a vehicle 1 that has software with functions for processing input quantities that serve to form output quantities comprises the steps listed below according to a first embodiment.

In a first step, the vehicle 1 is used to perform, complete or execute a driving cycle (for instance, NEDC [New European Driving Cycle], WLTP [Worldwide Harmonized Light-Duty Vehicles Test Procedure]) on a roller dynamometer, that is to say, a testing device or test installation, whereby input quantities and output quantities of the electronic control unit 3 or of the electronic control unit 4 or of all of the electronic control units 3, 4 of the vehicle 1 are recorded. The person skilled in the art is familiar with all of the details of the execution of a driving cycle, in other words, with the requisite technology and the compliance with the applicable or legally required conditions (calibration, ambient conditions, climate-control). The input quantities and output quantities of the electronic control unit 3 or of the electronic control unit 4 or of all of the electronic control units 3, 4 are likewise recorded in a generally known manner, for instance, employing a data recorder. A driving cycle with a vehicle 1 that has only one driven axle is executed in the familiar manner, with stationary, that is to say, non-moving, wheels of the non-driven axle. Consequently, even though the signals relating to the rotational speed of the wheels of the non-driven axle are recorded, these signals mean that there is no rotation or movement of the wheels during the execution of the driving cycle. For the rest, the driving cycle with a vehicle 1 is executed in the familiar manner, without any change (or substantial change) being made to the turning angle of the steering wheel of the vehicle 1 (steering angle) during the driving cycle. Consequently, even though the signal that relates to the steering angle of the steering wheel of the vehicle 1 is recorded, this signal means that no change (or no substantial change) is made to the turning angle of the steering wheel of the vehicle 1 during the execution of the driving cycle. In any case, one of these signals (rotational speed of the wheels of the non-driven axle, steering angle) or several or all of these signals are sent to the electronic control unit 3 or to the additional electronic control unit 4 or to both of the electronic control units 3, 4 via or by means of the bus system 6, and they are then processed into output signals by means of the appertaining electronic control unit 3, 4 or on the basis of the functions comprised by the appertaining electronic control unit 3, 4. Of course, the same approach is also used for all of the additional signals, in other words, especially also for the signals (input signals) that relate to the rotational speed of the crankshaft of the engine 2 (rotational speed sensor), the load of the engine 2 (torque, intake-air pressure, throttle valve position, fuel injection quantity) and the combustion air-fuel ratio (lambda probe), so that these signals are processed into output signals by means of the electronic control unit 3 or by means of the functions comprised in the software of the electronic control unit 3. As already described, in any case, input quantities and output quantities of the electronic control unit 3 or of the electronic control unit 4 or of all of the electronic control units 3, 4 of the vehicle 1 are recorded, and it is freely selectable whether some of them or all of them are recorded. In summary, after the execution of the driving cycle on a testing device or roller dynamometer, the recorded input signals and output signals of the electronic control units 3, 4 are available for further use.

According to an embodiment of the invention, in another step, the driving cycle in accordance with the first step is repeated, namely, without once again executing the driving cycle on an actual testing device or roller dynamometer. According to the invention, this can be done in a wide variety of ways.

For instance, the electronic control unit 3 (for testing the software of this electronic control unit 3 or for identifying non-documented functions in the software of this electronic control unit 3) can be connected to the actuators that are also connected to the electronic control unit 3 if, in accordance with the first step, a driving cycle with the vehicle 1 is executed on a testing device or roller dynamometer (naturally, these do not need to be the identical actuators). This means that a so-called "breadboard construction" can be used, whereby the electronic control unit 3 and the cited actuators are incorporated into a part of the on-board system of the vehicle or a part of the vehicle electronics, or else into the entire on-board system of the vehicle or into the entire vehicle electronics, at least to such an extent that the electronic control unit 3 and the cited actuators cooperate in the same way as when a driving cycle is being executed with the vehicle 1 on a testing device or roller dynamometer in accordance with the first step. In any case, in this manner, the electronic control unit 3, as part of the cited assembly consisting of the electronic control unit 3 and actuators, can be stimulated or excited on the basis of the input quantities that had been recorded in the first step.

According to the invention, it is also possible to connect the electronic control unit 3 to a simulator, especially to an HIL simulator (hardware-in-the-loop simulator) and thus to embed the electronic control unit 3, at least partially, into a (virtual) simulated environment, a process in which the actuators are simulated. Of course, actuators in the form of (at least structurally equivalent) actual parts can also be installed in conjunction with the HIL simulator, as in the above-mentioned case. In this manner, in conjunction with the HIL simulator, it is also possible to stimulate or excite the electronic control unit 3, as part of the cited assembly consisting of the electronic control unit 3 and simulated actuators or actual actuators, on the basis of the input quantities that had been recorded in the first step. This means that the system that is to be controlled is not being simulated by means of the HIL simulator on the basis of a model, in other words, the inputs of the electronic control unit 3 are not stimulated or excited with sensor data from a model. Rather, in contrast to the execution of the driving cycle on a testing device or dynamometer in the first step, there are no actual sensors in this additional step. Thus, the electronic control unit 3 is electrically stimulated or excited directly, namely, on the basis of the measured data acquired in reality (in the first step), said data being quasi fed into the testing environment on the HIL simulator into the electronic control unit, whereby the measured data acquired in reality corresponds to the input signals of the electronic control unit 3 or of the electronic control units 3, 4 that had been recorded in the first step. By the same token, the output quantities of the electronic control unit 3, for instance, for activating at least one actuator, is not read back in any model. Consequently, the HIL simulator is very useful for this additional step since it comprises not only a computer that can meet the real-time requirements of the application in question, but also digital and analog input and output interfaces leading to the electronic control unit and to the dummy loads or actual actuators that are present.

Moreover, according to the invention, in an additional step, the driving cycle can be repeated, namely, without once again executing the driving cycle on a testing device or roller dynamometer, so that now it is no longer the electronic control unit 3, but rather only the software of the electronic control unit 3 that is being embedded into an at least partially (virtual) simulated environment, a process in which the actuators (SIL, software-in-the-loop) are simulated. In this context, only the software in an at least partially simulated environment is still provided for a test and it does not run on the target system (electronic control unit), but rather on a development computer. In other words, over the further course, it is only the software that is still being tested. In this variant, in contrast to HIL, no special hardware is employed. The software of the electronic control unit 3, 4 is executed here specifically on the development computer along with the simulated model (of the actuators), instead of running on the target hardware (electronic control unit 3) as is the case with HIL. In any case, this makes it possible to stimulate or excite the software of the electronic control unit 3 as part of the cited assembly consisting of the electronic control unit 3 and simulated actuators in conjunction with the SIL simulation on the basis of the input quantities that had been recorded in the first step. As described above in conjunction with the HIL simulator, here too, the system that is to be controlled is not being simulated on the basis of a model, in other words, the inputs of the electronic control unit 3 or of the software are not stimulated or excited with sensor data from a model. Rather, in contrast to the execution of the driving cycle on a testing device or roller dynamometer in the first step, no actual sensors are present in this additional step. In other words, the software of the electronic control unit 3 is stimulated or excited directly (electrically), namely, on the basis of the measured data or input quantities acquired in reality (in the first step), which are quasi fed into the testing environment on the development computer into the software of the electronic control unit 3, whereby the measured data acquired in reality corresponds to the input signals of the electronic control unit 3 or of the electronic control units 3, 4 that had been recorded in the first step. By the same token, the output quantities of the electronic control unit 3, for example, for activating an actuator, are not read back in any model. Consequently, the SIL simulation is very useful for this additional step since it is not only the case that a suitable computer is available that can meet the real-time requirements of the application in question, but also that such systems or laboratory set-ups have suitable digital and analog input and output interfaces.

In any case, in this additional step, that is to say, in order to repeat the driving cycle in accordance with the first step without once again carrying out the driving cycle on a testing device or roller dynamometer, the electronic control unit 3 or the software of the electronic control unit 3 is stimulated or excited on the basis of the input quantities that had been recorded in the first step. In other words, the input quantities that had been recorded in the first step are sent to the electronic control unit 3 or to the software of the electronic control unit 3. According to an embodiment of the invention, however, in this process (that is to say, at the time of the excitation or stimulation, or else for purposes of the excitation or stimulation, or else before the excitation or stimulation), the input quantities or input signals that had been recorded in the first step are changed or manipulated. In other words, the electronic control unit 3 or the software of the electronic control unit 3 is excited or stimulated in conjunction with the change of one input quantity that had been recorded in the first step or the change of several input quantities that had been recorded in the first step. The change can be made here in any desired manner. For instance, the appertaining input quantity can be changed in that this quantity or this signal is increased or decreased (addition of an offset to the signal or multiplication of the signal or signal value by a factor), that is to say, in that the amplitude or the level of the appertaining signal is influenced or else its frequency is raised or lowered. That is to say, a constant signal (in other words, the appertaining input quantity that had been recorded in the first step) can also be changed in that a change is made to the constant signal or else a frequency is superimposed onto the constant signal. In other words, an input quantity that had been recorded in the first step and whose signal level is equal to zero or close to zero can be raised or lowered so that, instead of representing a low state (0V), this signal represents a high state (xV). For example, an input quantity (of the appertaining electronic control unit 3, 4) that had been recorded in the first step relates to the steering angle of the vehicle 1. Since, in the first step, a driving cycle of the vehicle 1 was carried out on a testing device or roller dynamometer, the signal of the steering-angle sensor, in other words, a possible input quantity of the electronic control unit 3 or of the electronic control units 3, 4, consistently has a level of 0 (low) or close to 0, and then in any case, this signal or this input quantity means that, while the driving cycle is actually being executed on the testing device or roller dynamometer, no such steering movement takes place of the kind that would take place if the vehicle 1 were moving (e.g. in actual traffic), and if it were not, in fact, standing stationary with respect to the surroundings or road surface, namely, on a testing device or roller dynamometer. This input quantity that had been recorded in the first step is then changed in the additional step in that (for purposes of or during or at the time of the excitation or stimulation of the electronic control unit 3, 4 or of the software), the steering takes place quasi virtually, that is to say, a steering movement is simulated by changing this input quantity that had been recorded in the first step, for instance, in that the (essentially) constant input quantity is changed or else in that a frequency is superimposed onto the constant signal (that had been recorded in the first step). According to an embodiment of the invention, the simulation of a moving vehicle in conjunction with input quantities of an electronic control unit 3, 4 that were acquired when the vehicle 1 was used to execute a driving cycle (for example, NEFZ, WLTP) on a testing device or roller dynamometer can be carried out not only by changing the signal of the steering-angle sensor, but rather, for example, also by changing the signals of the navigation system of the vehicle 1. These signals, which are then sent in changed or manipulated form to the electronic control unit 3, 4 that is to be tested or to the software that is to be tested or with which the electronic control unit 3, 4 or the corresponding software is stimulated or excited, first show that the vehicle 1 is not moving with respect to the surroundings or road surface, since, in the first step, the vehicle 1 was used to execute a driving cycle on a roller dynamometer or testing device. These signals of the navigation system are changed or manipulated in such a way that, in the additional step, it is simulated that the vehicle 1 is moving with respect to the surroundings or road surface. Of course, it is also possible to employ input quantities of the electronic control unit 3 that represent the rotational speed of the stationary wheels of the non-driven axle when a driving cycle is being executed with a vehicle 1 on a roller dynamometer or testing device in order to simulate that the vehicle 1 is moving with respect to the surroundings or road surface. These signals or signal values that had been recorded in the first step amount to (essentially) zero or else they indicate that the wheels of an axle (especially the non-driven axle) of the vehicle 1 are not turning, in other words, they indicate that the vehicle 1 was not moving with respect to the surroundings or road surface during the roller dynamometer test or during the test on a testing device that was carried out in the first step. By changing this signal or signals that serve to stimulate or excite the electronic control unit 3, 4 or the software that is to be tested, that is to say, by increasing the level and/or by superimposing a frequency, it is simulated that the vehicle 1 is moving with respect to the surroundings or road surface.

In summary, in this additional step, that is to say, in order to repeat the driving cycle in accordance with the first step without once again carrying out the drive cycle on a roller dynamometer or testing device, the software of the electronic control unit 3, 4 that is to be tested is stimulated or excited, or else the electronic control unit 3, 4 that is to be tested is stimulated or excited, namely, on the basis of the input quantities that had been recorded in the first step, whereby the input quantities or input signals that had been recorded in the first step are changed for purposes of the stimulation or excitation, and the input quantities or input signals are changed in such a way as to simulate a movement of the vehicle 1 with respect to the surroundings or road surface. As a result, output quantities of the electronic control unit 3, 4 or of the software, are once again made available, namely, those output quantities of the electronic control unit 3, 4 or of the software which, in this additional step, when the driving cycle in accordance with the first step is repeated without once again executing the driving cycle on a testing device or roller dynamometer, were obtained on the basis of the input quantities that had been recorded in the first step by a stimulation or excitation of the software of the electronic control unit 3, 4 that is to be tested, or else by a stimulation or excitation of the electronic control unit 3, 4 that is to be tested, whereby the input quantities or input signals that had been recorded in the first step were changed and the input quantities or input signals were changed in such a way that a movement of the vehicle 1 with respect to the surroundings or road surface was simulated.

In yet another additional step, the output quantities of the electronic control unit 3, 4 or the output quantities of the software that had been recorded in the first step are compared to the output quantities of the electronic control unit 3, 4 or to the output quantities of the software that are thus made available or that were obtained in that the driving cycle in accordance with the first step was repeated without once again executing the driving cycle on a testing device or roller dynamometer, whereby the software of the electronic control unit 3, 4 that is to be tested or else the electronic control unit 3, 4 that is to be tested has been stimulated or excited on the basis of the input quantities that had been recorded in the first step, which were changed or manipulated according to an embodiment of the invention so that a movement of the vehicle 1 with respect to the surroundings or road surface was simulated or reproduced. In other words, the output quantities of the software or of the electronic control unit 3, 4 in accordance with the first as well as the subsequent additional step are compared to each other.

According to an embodiment of the invention, this identifies the fact that the software or the electronic control unit 3, 4 has a function which detects whether or not a driving cycle is being executed on a testing device or roller dynamometer, that the output quantities that had been recorded in the first step (in other words, at least one of these output quantities) deviate from the output quantities that were provided or determined or recorded in the additional step (in other words, at least one of these additional output quantities), whereby, if it was identified that the software or the electronic control unit 3, 4 comprises such a function, this result is displayed or indicated or transmitted, so that it is available for further processing, in other words, for instance, an error message appears or a state quantity is output indicating that the software or the electronic control unit 3, 4 has such a function. In other words, if a comparison of the output quantities, for example, of the electronic control unit 3 of the engine 2 indicates that, as a result of the simulation of a movement of the vehicle 1 with respect to the surroundings or road surface brought about by changing the input quantities or input signals of the software or of the electronic control unit 3 that had been recorded in the first step (or else as a result of the stimulation or excitation of the software or of the electronic control unit 3 with input quantities changed according to an embodiment of the invention), then signals or output signals of the software or of the electronic control unit 3 that were processed by the software or by the electronic control unit 3 and that deviate from the output signals of the software or of the electronic control unit 3 that had been recorded in the first step are sent to the actuators (in other words, to at least one actuator), and then the software or the electronic control unit 3 comprises a function that detects whether or not a driving cycle is being executed on a testing device or roller dynamometer. In particular, this relates to output signals that exert an influence of the fuel consumption and on the emissions of the engine 2 or of the vehicle 1, in other words, especially injectors (start of the actuation, duration of the actuation, frequency of the actuation per operational cycle), throttle valves (AGR, intake air) or spark plugs, to which signals (output signals of the software or of the electronic control unit 3) that were processed by the software or by the electronic control unit 3 are sent. In summary, according to an embodiment of the invention, when it has been identified that the software or the electronic control unit 3,4 comprises at least one function that detects whether or not a driving cycle is being executed on a testing device or roller dynamometer, then this software or electronic control unit 3,4 is associated with a specific group, class or set of software or electronic control units 3, 4 which do not meet a certain requirement or do not have a certain quality, especially because the software or the electronic control unit 3, 4 comprises at least one undesired or impermissible and/or non-documented function. In other words, the software or the electronic control unit 3, 4 is evaluated in terms of the presence of a function that detects whether or not a driving cycle is being executed on a testing device or roller dynamometer. In practical terms, a corresponding evaluation quantity or a characteristic value of the software or of the electronic control unit 3, 4 can be formed and output. In particular, as a function of the identification according to an embodiment of the invention of at least one function that detects whether or not a driving cycle is being executed on a testing device or roller dynamometer, it is possible to control the subsequent development steps during the development phase of the software or of the electronic control unit 3, 4. This control consists, for example, of excluding a group of functions from being further developed or processed during a subsequent development step.

In another embodiment, it can be provided that, after the first step, the driving cycle in accordance with the first step is repeated, namely, without once again executing the driving cycle on a testing device or roller dynamometer, but at first without a change being made to the input quantities that had been recorded in the first step, so that, on the basis of the initially unchanged input quantities that had been recorded in the first step, the software of the electronic control unit 3, 4 or the electronic control unit 3, 4 is stimulated or excited. In other words, at first it is checked whether it is at all possible to repeat the driving cycle in accordance with the first step without once again executing the driving cycle on a testing device or roller dynamometer, (with the vehicle 1) by stimulating or exciting the software or the electronic control unit 3, 4 with the input quantities that had been recorded in the first step. In this manner, according to an embodiment of the invention, it is advantageously possible, before the actual test of the electronic control unit 3, 4 or of the software, to ascertain whether the selected simulation environment ("breadboard construction", HIL, SIL) accurately replicates the actual vehicle 1. If this is not the case, the possibility exists to search for errors or to make an adjustment.

According to the invention, the method for testing an electronic control unit 3, 4 that is used for a vehicle 1 and that encompasses software with functions for processing input quantities that serve to form output quantities comprises the steps listed below according to another embodiment.

In a first step, a driving cycle is performed, completed or executed with a vehicle 1 that is not standing still, in other words, a vehicle 1 that is moving with respect to the surroundings or road surface and that is equipped with a mobile emission measuring device that serves to analyze the exhaust gas emissions of the vehicle 1 (Portable Emission Measurement System—PEMS) whereby, in this process, input quantities and output quantities of the electronic control unit 3 or of the electronic control unit 4 or else all of the electronic control units 3, 4, of the vehicle 1 are recorded. In other words, the emissions of the vehicle 1 are ascertained during actual practice, that is to say, actual driving on public roads under the influence of actual, changing environmental conditions and road circumstances, whereby the exhaust-gas emissions at the end of the exhaust pipe of the vehicle 1 are measured (RDE test method). The person skilled in the art is familiar with all of the details of the execution of such a driving cycle, in other words, with the requisite technology and the compliance with the applicable or legally required conditions (calibration, ambient conditions, climate-control, frequencies). The input quantities and output quantities of the electronic control unit 3 or of the electronic control unit 4 or of all of the electronic control units 3, 4 are likewise recorded in a generally known manner, for instance, employing a data recorder.

A driving cycle with a vehicle 1 that is equipped with a mobile emission measuring device that serves to analyze the exhaust gas emissions is executed in a known manner, for example, in that the emission measuring device is connected to the source of electric energy that is provided to supply electric energy to a trailer. Consequently, during the execution of the above-mentioned driving cycle, at least one signal relating to the supply of electric energy to a trailer or relating to the detection of a trailer is recorded, whereby the at least one signal means that, during the execution of the driving cycle, the trailer is being supplied with electric energy, in other words, the at least one signal indicates that a trailer is connected to the vehicle 1, whereby the trailer, however, is the emission measuring device. As already described, the signal can contain information relating to a microswitch installed in the trailer socket.

Via the bus system 6 or by means of the bus system 6, this at least one signal is sent to the electronic control unit 3 or to the additional electronic control unit 4, or else to both of the electronic control units 3, 4 and then processed into output signals by means of the appertaining electronic control unit 3, 4 on the basis of the functions comprised by the appertaining electronic control unit 3, 4. Of course, the same approach is also used for all of the additional signals, in other words, especially also for the signals (input signals) that relate to the rotational speed of the crankshaft of the engine 2 (rotational speed sensor), the load of the engine 2 (torque, intake-air pressure, throttle-valve position, fuel injection quantity) and the combustion air-fuel ratio (lambda probe), so that these signals are processed into output signals by means of the electronic control unit 3 or by means of the functions comprised in the software of the electronic control unit 3.

As already described, in any case, input quantities and output quantities of the electronic control unit 3 or of the electronic control unit 4 or of all of the electronic control units 3, 4 of the vehicle 1 are recorded, and it is freely selectable whether some of them or all of them are recorded. In summary, after the execution of the driving cycle on a testing device or roller dynamometer, the recorded input signals and output signals of the electronic control units 3, 4 are available for further use.

According to an embodiment of the invention, in another step, the driving cycle in accordance with the first step is repeated, namely, without executing the driving cycle with a vehicle 1 that is moving with respect to the surroundings or road surface and that is equipped with a mobile emission measuring device that serves to analyze the exhaust gas emissions of the vehicle. According to the invention, this can be done in a wide variety of ways.

For instance, the electronic control unit 3 (for testing software of this electronic control unit 3 or for identifying non-documented functions in the software of this electronic control unit 3) can be connected to the actuators that are also connected to the electronic control unit 3 if a driving cycle in accordance with the first step is executed with a vehicle 1 that is equipped with a mobile emission measuring device and that is moving with respect to the surroundings or road surface (naturally, these need not be the identical actuators). This means that a so-called "breadboard construction" can be used, whereby the electronic control unit 3 and the cited actuators are incorporated into a part of the on-board system of the vehicle or a part of vehicle electronics or else into the entire on-board system of the vehicle or into the entire vehicle electronics at least to such an extent that the electronic control unit 3 and the cited actuators cooperate in the same way as when, in accordance with the first step, a driving cycle is being executed with the vehicle 1 that is equipped with a mobile emission measuring device and that is moving with respect to the surroundings or road surface. In any case, in this manner, the electronic control unit 3, as part of the cited assembly consisting of the electronic control unit 3 and actuators, can be stimulated or excited on the basis of input quantities that had been recorded in the first step.

According to the invention, it is also possible to connect the electronic control unit 3 to a simulator, especially to an HIL (hardware-in-the-loop) simulator and thus to embed the electronic control unit 3, at least partially, into a (virtual) simulated environment, a process in which the actuators are simulated. Of course, as in the previously mentioned case, actuators as (at least structurally equivalent) actual parts can also be installed in conjunction with the HIL simulator. In this manner, in conjunction with the HIL simulator, it is also possible to stimulate or excite the electronic control unit 3, as part of the cited assembly consisting of the electronic control unit 3 and simulated actuators or actual actuators, on the basis of the input quantities that had been recorded in the first step. This means that the system that is to be controlled is not being simulated by means of the HIL simulator on the basis of a model, in other words, the inputs of the electronic control unit 3 are not stimulated or excited with sensor data from a model. Rather, in contrast to the execution of the driving cycle on a testing device or dynamometer in the first step, there are no actual sensors in this additional step. Thus, the electronic control unit 3 is electrically stimulated or excited directly, namely, on the basis of the measured data acquired in reality (in the first step), said data being quasi fed into the testing environment on the HIL simulator into the electronic control unit, whereby the measured data acquired in reality corresponds to the input signals of the electronic control unit 3 or of the electronic control units 3, 4 that had been recorded in the first step. By the same token, the output quantities of the electronic control unit 3, for instance, for activating at least one actuator, is not read back in any model. Consequently, the HIL simulator is very useful for this additional step since it comprises not only a computer that can meet the real-time requirements of the application in question, but also digital and analog input and output interfaces leading to the electronic control unit and to the dummy loads or actual actuators that are present.

Moreover, according to the invention, in an additional step, the driving cycle can be repeated, namely, without once again executing the driving cycle with a vehicle 1 that is equipped with a mobile emission measuring device that serves to analyze the exhaust gas emissions and that is moving with respect to the surroundings or road surface, so that now it is no longer the electronic control unit 3, but rather only the software of the electronic control unit 3 that is being embedded into an at least partially (virtual) simulated environment, a process in which the actuators (SIL, software-in-the-loop) are simulated. In this context, only the software in an at least partially simulated environment is still provided for a test and it does not run on the target system (electronic control unit), but rather on a development computer. In other words, over the further course, it is only the software that is still being tested. In this variant, in contrast to HIL, no special hardware is employed. The software of the electronic control unit 3, 4 is executed here especially on the development computer along with the simulated model (of the actuators), instead of running on the target hardware (electronic control unit 3) as is the case with HIL. In any case, this makes it possible to stimulate or excite the software of the electronic control unit 3 as part of the cited assembly consisting of the electronic control unit 3 and simulated actuators in conjunction with the SIL simulation on the basis of the input quantities that had been recorded in the first step. As described above in the context of the HIL simulator, here too, the system that is to be controlled is not being simulated on the basis of a model, in other words, the inputs of the electronic control unit 3 or of the software are not stimulated or excited with sensor data from a model. Rather, in contrast to the execution of the actual driving cycle with a vehicle that is equipped with a mobile emission measuring device in the first step, no actual sensors are present in this additional step. In other words, the software of the electronic control unit 3 is stimulated or excited directly (electrically), namely, on the basis of the measured data or input quantities acquired in reality (in the first step), which are quasi fed into the testing environment on the development computer into the software of the electronic control unit 3, whereby the measured data acquired in reality corresponds to the input signals of the electronic control unit 3 or of the electronic control units 3, 4 that had been recorded in the first step. By the same token, the output quantities of the electronic control unit 3, for example, for activating an actuator, are not read back in any model. Consequently, the SIL simulation is very useful for this additional step since it is not only the case that a suitable computer is available that can meet the real-time requirements of the application in question, but also that such systems or laboratory set-ups have suitable digital and analog input and output interfaces.

In any case, in this additional step, that is to say, in order to repeat the driving cycle in accordance with the first step without once again carrying out the driving cycle with a vehicle 1 that is moving with respect to the surroundings or road surface and that is equipped with a mobile emission measuring device that serves to analyze the exhaust gas emissions, the electronic control unit 3 or the software of the electronic control unit 3 is stimulated or excited on the basis of the input quantities that had been recorded in the first step. In other words, the input quantities that had been recorded in the first step are sent to the electronic control unit 3 or to the software of the electronic control unit 3. According to an embodiment of the invention, however, in this process (that is to say, at the time of the excitation or stimulation, or else for purposes of the excitation or stimulation, or else before the excitation or stimulation), the input quantities or input signals that had been recorded in the first step are changed or manipulated. In other words, the electronic control unit 3 or the software of the electronic control unit 3 is excited or stimulated in conjunction with the change of an input quantity that had been recorded in the first step or of several input quantities that had been recorded in the first step. The change can be made here in any desired manner. For instance, the appertaining input quantity can be changed in that this quantity or this signal is increased or decreased (addition of an offset to the signal or multiplication of the signal or signal value by a factor), that is to say, in that the amplitude or the level of the appertaining signal is influenced or else its frequency is raised or lowered. That is to say, a constant signal (in other words, the appertaining input quantity that had been recorded in the first step) can also be changed in that a change is made to the constant signal or else a frequency is superimposed onto the constant signal. In other words, an input quantity that had been recorded in the first step and whose signal level is equal to zero or close to zero can be raised or lowered so that, instead of representing a low state (0V), this signal represents a high state (xV).

For example, an input quantity (of the appertaining electronic control unit 3, 4) that had been recorded in the first step relates to the state as to whether a trailer is hitched to the vehicle 1, or else whether electric energy is being supplied to a trailer or to another aggregate via the trailer socket located on the vehicle 1. Since, in the first step, a driving cycle was executed by means of the vehicle 1, whereby the vehicle 1 was moving with respect to the surroundings or road surface and the vehicle 1 was equipped with a mobile emission measuring device that serves to analyze the exhaust gas emissions, the signal relating to the supply of electric energy to a trailer or relating to the trailer detection, in other words, the signal that is provided or influenced by the microswitch arranged in the trailer socket, that is to say, a possible input quantity of the electronic control unit 3 or of the electronic control units 3, 4, consistently has a level of 1 (high) or close to 1.

In any case, this signal or this input quantity means that, while the driving cycle is actually being executed with the vehicle 1 that is equipped with a mobile emission measuring device that serves to analyze the exhaust gas emissions, a state or a condition prevails indicating that a trailer is hitched to the vehicle 1 or that a trailer connected to the vehicle 1, in fact, that a mobile emission measuring device is connected to the on-board system of the vehicle 1 via the trailer socket installed on the vehicle 1 or else is being provided with electric energy.

This input quantity that had been recorded in the first step is then changed in the additional step in that (for purposes of or during or at the time of the excitation or stimulation of the electronic control unit 3, 4 or of the software), the trailer is uncoupled quasi virtually, or the supply of electric energy to the trailer is interrupted, that is to say, a change of this input quantity that had been recorded in the first step simulates that there is no trailer that is coupled to the vehicle or that is being supplied with electric energy, for example, the (essentially) constant input quantity is changed or else in that a certain frequency is superimposed onto the constant signal (which had been recorded in the first step).

Of course, it is also possible to employ input quantities of the electronic control unit 3 or of the electronic control unit 4 which result from the supply of electric energy to a trailer or to the emission measuring device in case of the actual execution of a driving cycle by means of the vehicle 1 in order to simulate that the vehicle 1 is not equipped with a mobile emission measuring device that serves to analyze the exhaust gas emissions. These signals or signal values that had been recorded in the first step (essentially) have values that are greater than zero (0) or they indicate that, at a certain electric voltage, a certain electric current is flowing, in other words, they indicate that the vehicle 1 is connected to a trailer that has electric consumers or an emission measuring device during the execution of the test or driving cycle in the first step. By changing this signal or signals that serve to stimulate or excite the electronic control unit 3, 4 or the software that is to be tested, that is to say, by lowering the level and/or by superimposing a frequency, it is simulated in the additional step that the vehicle 1 is not connected to a trailer that has electric consumers or an emission measuring device.

In summary, in this additional step, that is to say, in order to repeat the driving cycle in accordance with the first step without once again executing this test or driving cycle with a vehicle 1 that is moving with respect to the surroundings and that is equipped with a mobile emission measuring device that serves to analyze the exhaust gas emissions, the software of the electronic control unit 3, 4 that is to be tested or the electronic control unit 3, 4 that is to be tested is stimulated or excited, namely, on the basis of the input quantities that had been recorded in the first step, whereby the input quantitites or the input signals that had been recorded in the first step and that serve for the stimulation or excitation are changed and the input quantitites or input signals are changed in such a way that the absence of a trailer or of an emission measuring device is simulated.

As a result, output quantities of the electronic control unit 3, 4 or of the software are once again made available, namely, those output quantities of the electronic control unit 3, 4 or of the software which, in this additional step, were obtained on the basis of the input quantities that had been recorded in the first step by a stimulation or excitation of the software of the electronic control unit 3, 4 that is to be tested or by a stimulation or excitation of the electronic control unit 3, 4 that is to be tested, whereby the input quantities or the input signals that had been recorded in the first step were changed and the input quantities or the input signals were changed in such a way that the absence of a trailer or of an emission measuring device was simulated.

In yet another additional step, the output quantities of the electronic control unit 3, 4 or the output quantities of the software that had been recorded in the first step are compared to the output quantities of the electronic control unit 3, 4 or to the output quantities of the software that are thus made available or that were obtained in that the driving cycle in accordance with the first step was repeated without once again executing this test or driving cycle in reality with a vehicle 1 that is moving with respect to the surroundings and that is equipped with a mobile emission measuring device that serves to analyze the exhaust gas emissions, whereby the software of the electronic control unit 3, 4 that is to be tested or else the electronic control unit 3, 4 that is to be tested has been stimulated or excited on the basis of input quantities that had been recorded in the first step, which were changed or manipulated according to an embodiment of the invention, so that the absence of a trailer or of an emission measuring device was simulated or emulated. In other words, the output quantities of the software or of the electronic control unit 3, 4 in accordance with the first and the subsequent additional step are compared to each other.

According to an embodiment of the invention, this identifies the fact that the software or the electronic control unit 3, 4 has a function which detects whether or not the vehicle with which a driving cycle is being executed is equipped with a mobile emission measuring device that serves to analyze the exhaust gas emissions of the vehicle, that the output quantities that had been recorded in the first step (in other words, at least one of these output quantities) deviate from the output quantities that were provided or determined or recorded in the additional step (in other words, at least one of these additional output quantities), whereby, if it was identified that the software or the electronic control unit 3, 4 comprises such a function, this result is displayed or indicated or transmitted, so that it is available for further processing, in other words, for instance, an error message appears or a state quantity is output indicating that the software or the electronic control unit 3, 4 has such a function. In other words, if a comparison of the output quantities, for example, of the electronic control unit 3 of the engine 2 indicates that, as a result of the simulation of the absence of a trailer or emission measuring device brought about by changing the input quantities or input signals of the software or of the electronic control unit 3 that had been recorded in the first step (or else as a result of the stimulation or excitation of the software or of the electronic control unit 3 with input quantities changed according to an embodiment of the invention), then signals or output signals of the software or of the electronic control unit 3 that were processed by the software or by the electronic control unit 3 and that deviate from the output signals of the software or of the electronic control unit 3 that had been recorded in the first step are sent to the actuators (in other words, to at least one actuator), and then the software or the electronic control unit 3 comprises a function that detects whether or not a driving cycle is being executed with a mobile emission measuring device. In particular, this relates to output signals that exert an influence of the fuel consumption and on the emissions of the engine 2 or of the vehicle 1, in other words, especially injectors (start of the actuation, duration of the actuation, frequency of the actuation per operational cycle), throttle valves (AGR, intake air) or spark plugs, to which signals (output signals of the software or of the electronic control unit 3) that were processed by the software or by the electronic control unit 3 are sent. In summary, according to an embodiment of the invention, when it has been identified that the software or the electronic control unit 3,4 comprises at least one function that detects whether or not the vehicle with which a driving cycle is being executed is equipped with a mobile emission measuring device that serves to analyze the exhaust gas emissions of the vehicle, then this software or this electronic control unit 3,4 is associated with a specific group, class or set of software or electronic control units 3, 4 which do not meet a certain requirement or do not have a certain quality, especially because the software or the electronic control unit 3, 4 comprises at least one undesired or impermissible and/or non-documented function. In other words, the software or the electronic control unit 3, 4 is evaluated in terms of the presence of a function that detects whether or not a driving cycle is being executed on a testing device or roller dynamometer. In practical terms, a corresponding evaluation quantity or a characteristic value of the software or of the electronic control unit 3, 4 can be formed and output. In particular, as a function of the identification according to an embodiment of the invention of at least one function that detects whether or not the vehicle with which a driving cycle is being executed is equipped with a mobile emission measuring device that serves to analyze the exhaust gas emissions of the vehicle, it is possible to control the subsequent development steps during the development phase of the software or of the electronic control unit 3, 4. This control consists, for example, of excluding a group of functions from being further developed or processed during a subsequent development step.

In one embodiment, it can be provided that, after the first step, the driving cycle in accordance with the first step is repeated, namely, without once again executing the driving cycle with a moving vehicle having a mobile emission measuring device that serves to analyze the exhaust gas emissions, but at first without a change being made to the input quantities that had been recorded in the first step, so that, on the basis of the initially unchanged input quantities that had been recorded in the first step, the software of the electronic control unit 3, 4 or of the electronic control unit 3, 4 is stimulated or excited. In other words, at first it is checked whether it is at all possible to repeat the driving cycle in accordance with the first step without once again executing the driving cycle with the vehicle 1 having a mobile emission measuring device that serves to analyze the exhaust gas emissions, by stimulating or exciting the software or the electronic control unit 3, 4 with the input quantities that had been recorded in the first step. In this manner, according to the an embodiment of invention, it is advantageously possible, before the actual test of the electronic control unit 3, 4 or of the software, to ascertain whether the selected simulation environment ("breadboard construction", HIL, SIL) accurately replicates the actual vehicle 1. If this is not the case, the possibility exists to search for errors or to make an adjustment.

In particular, the device according to an embodiment of the invention for testing software of an electronic control unit of a vehicle 1 is a computer having a CPU and a machine-readable storage medium that is configured to carry out a method according to the invention, whereby a computer program is stored on the storage medium and this computer program encompasses all of the steps of a method according to the invention and controls them, whereby the computer program is run by means of the CPU. In particular, all of the steps of a method according to the invention can be controlled by means of a sequence control, whereby this sequence control is stored on the cited storage medium.

According to an embodiment of the invention, a computer program product is also being put forward, having a program code stored on a machine-readable storage medium in order to execute a method according to the invention when the program is run on a computer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for testing software of an electronic control unit of a vehicle, the software comprising functions for processing input quantities that serve to form output quantities of the electronic control unit, the method comprising:
   in a first step, executing a driving cycle with the vehicle on a testing device, whereby the vehicle is not moving with respect to the surroundings, the input quantities and output quantities of the electronic control unit being recorded in the first step;
   in an additional step, repeating the driving cycle in accordance with the first step without once again executing the driving cycle with the vehicle on the testing device so that additional output quantities are made available, the driving cycle being repeated in the additional step in that the software or the electronic control unit is excited or stimulated with the input quantities that had been recorded in accordance with the first step, wherein at least one input quantity that serves to excite or stimulate the software and that had been recorded in the first step is changed in the additional step in such a way that a movement of the vehicle with respect to the surroundings is simulated;
   comparing the output quantities that had been recorded in the first step to the additional output quantities that are available in accordance with the additional step;
   ascertaining that the software comprises a function that recognizes whether or not a driving cycle is being executed with the vehicle on the testing device, based on there being a deviation between at least one output quantity that had been recorded in the first step and the corresponding output quantity provided in accordance with the additional step; and, based thereon,
   excluding at least one of the functions of the electronic control unit from being further developed or processed during a subsequent development step.

2. The method according to claim 1, wherein the at least one input quantity is changed in that at least one of a level and a frequency of a signal that represents the at least one input quantity is influenced.

3. A method for testing software of an electronic control unit of a vehicle, the software comprising functions for processing input quantities that serve to form output quantities of the electronic control unit, the method comprising:
   in a first step, executing a driving cycle with the vehicle, whereby the vehicle is moving with respect to the surroundings and the vehicle is equipped with a mobile emission measuring device that serves to analyze exhaust gas emissions, the input quantities and output quantities of the electronic control unit being recorded in the first step;
   in an additional step, repeating the driving cycle in accordance with the first step without once again executing the driving cycle with the vehicle that is equipped with the mobile emission measuring device that serves to analyze the exhaust gas emissions, so that additional output quantities are made available, the driving cycle being repeated in the additional step in that the software is excited or stimulated with the input quantities that had been recorded in accordance with the first step, wherein at least one input quantity that serves to excite or stimulate the software and that had been recorded in the first step is changed in the additional step in such a way that an absence of an equipment of the vehicle with the mobile emission measuring device that serves to analyze the exhaust gas emissions of the vehicle is simulated,
   comparing the output quantities that had been recorded in the first step to the output quantities that had been made available in accordance with the additional step;
   ascertaining that the software comprises a function that recognizes whether or not a driving cycle is being executed with the vehicle, whereby the vehicle is moving with respect to the surroundings, and the vehicle is equipped with a mobile emission measuring device that serves to analyze exhaust gas emissions, based on there being a deviation between at least one output quantity that had been recorded in the first step and the corresponding output quantity that had been made available in accordance with the additional step; and, based thereon,
   excluding at least one of the functions of the electronic control unit from being further developed or processed during a subsequent development step.

4. The method according to claim 3, wherein the at least one input quantity that had been recorded in the first step and that had been changed in the additional step relates to information indicating at least one of whether a trailer is hitched onto the vehicle or whether electric energy is being supplied to a trailer or to another aggregate via a trailer socket located on the vehicle.

5. A device for testing software of an electronic control unit of a vehicle, the software comprising functions for processing input quantities that serve to form output quantities of the electronic control unit, the device comprising:
- a data recorder;
- a testing device on which a driving cycle is executable with the vehicle; and
- a computer having a central processing unit (CPU) and a machine-readable storage medium having instructions stored thereon, wherein the instructions, upon being executed by the CPU, cause the CPU to provide for the following steps to be performed:
  - in a first step, executing the driving cycle with the vehicle on the testing device, whereby the vehicle is not moving with respect to the surroundings, the input quantities and output quantities of the electronic control unit being recorded in the first step;
  - in an additional step, repeating the driving cycle in accordance with the first step without once again executing the driving cycle with the vehicle on the testing device so that additional output quantities are made available, the driving cycle being repeated in the additional step in that the software or the electronic control unit is excited or stimulated with the input quantities that had been recorded in accordance with the first step, wherein at least one input quantity that serves to excite or stimulate the software and that had been recorded in the first step is changed in the additional step in such a way that a movement of the vehicle with respect to the surroundings is simulated;
  - comparing the output quantities that had been recorded in the first step to the additional output quantities that are available in accordance with the additional step;
  - ascertaining that the software comprises a function that recognizes whether or not a driving cycle is being executed with the vehicle on the testing device, based on there being a deviation between at least one output quantity that had been recorded in the first step and the corresponding output quantity provided in accordance with the additional step; and, based thereon,
  - excluding at least one of the functions of the electronic control unit from being further developed or processed during a subsequent development step.

6. A device for testing software of an electronic control unit of a vehicle, the software comprising functions for processing input quantities that serve to form output quantities of the electronic control unit, the device comprising:
- a data recorder; and
- a computer having a central processing unit (CPU) and a machine-readable storage medium having instructions stored thereon, wherein the instructions, upon being executed by the CPU, cause the CPU to provide for the following steps to be performed:
  - in a first step, executing a driving cycle with the vehicle, whereby the vehicle is moving with respect to the surroundings and the vehicle is equipped with a mobile emission measuring device that serves to analyze exhaust gas emissions, the input quantities and output quantities of the electronic control unit being recorded in the first step;
  - in an additional step, repeating the driving cycle in accordance with the first step without once again executing the driving cycle with the vehicle that is equipped with the mobile emission measuring device that serves to analyze the exhaust gas emissions, so that additional output quantities are made available, the driving cycle being repeated in the additional step in that the software is excited or stimulated with the input quantities that had been recorded in accordance with the first step, wherein at least one input quantity that serves to excite or stimulate the software and that had been recorded in the first step is changed in the additional step in such a way that an absence of an equipment of the vehicle with the mobile emission measuring device that serves to analyze the exhaust gas emissions of the vehicle is simulated,
  - comparing the output quantities that had been recorded in the first step to the output quantities that had been made available in accordance with the additional step;
  - ascertaining that the software comprises a function that recognizes whether or not a driving cycle is being executed with the vehicle, whereby the vehicle is moving with respect to the surroundings, and the vehicle is equipped with a mobile emission measuring device that serves to analyze exhaust gas emissions, based on there being a deviation between at least one output quantity that had been recorded in the first step and the corresponding output quantity that had been made available in accordance with the additional step; and, based thereon,
  - excluding at least one of the functions of the electronic control unit from being further developed or processed during a subsequent development step.

\* \* \* \* \*